United States Patent [19]

Weddigen et al.

[11] 4,184,013

[45] Jan. 15, 1980

[54] ELECTROCHEMICAL STORAGE CELL

[75] Inventors: Gert Weddigen, Heidelberg-Neuenheim; Wilfried Fischer, Neckargemünd; Herbert Kleinschmager, Eppelheim; Wilhelm Haar, Sandhausen, all of Fed. Rep. of Germany

[73] Assignee: Brown, Boveri & Cie AG, Mannheim, Fed. Rep. of Germany

[21] Appl. No.: 972,285

[22] Filed: Dec. 22, 1978

Related U.S. Application Data

[63] Continuation-in-part of Ser. No. 947,734, Oct. 2, 1978, abandoned, which is a continuation of Ser. No. 817,378, Jul. 20, 1977, abandoned.

[30] Foreign Application Priority Data

Jul. 24, 1976 [DE] Fed. Rep. of Germany ....... 2633455
Jul. 24, 1976 [DE] Fed. Rep. of Germany ....... 2633456

[51] Int. Cl.$^2$ .......................................... H01M 10/39
[52] U.S. Cl. .................................... 429/104; 429/218
[58] Field of Search ............... 429/104, 102, 191, 218, 429/212, 215

[56] References Cited

U.S. PATENT DOCUMENTS

| 3,672,995 | 6/1972 | Brown et al. | 429/104 |
| 3,679,480 | 7/1972 | Brown et al. | 429/104 |
| 4,012,563 | 3/1977 | Farrington et al. | 429/104 |

*Primary Examiner*—Anthony Skapars
*Attorney, Agent, or Firm*—Herbert L. Lerner

[57] ABSTRACT

An electrochemical storage cell or battery with at least one anode filled with a molten alkali metal as the anolyte and at least one cathode chamber filled with a sulfur-containing catholyte substance with the anode chamber and the cathode chamber separated from each other by an alkali-ion-conducting solid electrolyte. To the catholyte substance is added an additive which converts the sulfur chains into an electrically charged state for obtaining electromigration of the sulfur phase. This induces mobilization of the sulfur phase in the cathode chamber and prevents major accumulation of liquid sulfur as an insulator. As a result the cell can be repeatedly recharged with large currents to a greater capacity. Additives are a dienophilic compound or a reaction product of a dienophilic compound and sulfur.

23 Claims, 3 Drawing Figures

ELECTROCHEMICAL STORAGE CELL

CROSS-REFERENCE TO RELATED APPLICATION

This application is a continuation-in-part of our pending application entitled "Electrochemical Storage Cell", Ser. No. 947,734, filed Oct. 2, 1978 now abandoned, which is a continuation of our application Ser. No. 817,378, filed July 20, 1977, now abandoned.

BACKGROUND OF THE INVENTION

1. Field of the Invention

This invention relates to an electrochemical storage cell or battery with at least one anode chamber filled with a molten alkali metal as the anolyte and at least one cathode chamber filled with a sulfur-containing catholyte substance, with the chambers separated from each other by an alkali-ion-conducting solid electrolyte, and to additives to improve the recharging capability of the electrochemical storage cell.

2. Description of the Prior Art.

An electrochemical storage cell or battery based on alkali metal and sulfur having at least one anode chamber and one cathode chamber separated from each other by an ion-conducting solid electrolyte, and a felt fabric of graphite or carbon contained in the cathode chamber in addition to the sulfur is known in the art as shown by German Published Prosecuted Application No. 1 671 760.

An important disadvantage of such cells is, however, that they can be only partially recharged with large currents. In an Na/S cell, for instance, this disadvantage is related to the fact that sulfur (with small percentages of dissolved $Na_2S_5$) and $Na_2S_5$ (with percentages of dissolved sulfur) form two immiscible liquids at the operating temperature of such a cell, which is between 300° and 350° C. For, if a discharged Na/S cell which contains $Na_2S_3$ in the cathode chamber, is recharged, then sulfides richer in sulfur are formed first until $Na_2S_5$ has been produced in the entire cathode chamber or at least locally. Upon further charging, liquid sulfur is then produced at the points with a high electrochemical reaction rate. The sulfur being an insulator, blocks the electrochemical processes at these points.

In storage cells with high current densities, such as are presently planned for covering peak loads in electrical networks, particularly in connection with nuclear reactors, recharging as rapidly and completely as possible is especially important.

SUMMARY OF THE INVENTION

An object of the present invention is to provide an electrochemical storage cell or battery with at least one anode chamber filled with a molten alkali metal as the anolyte and at least one cathode chamber filled with a sulfur-containing catholyte substance wherein the internal resistance is limited by preventing major accumulations of liquid sulfur as an insulator and mobilization of the phases present in the cathode chamber is increased.

Another object of the invention is to provide additives which will promote rapid and more complete recharging of storage cells with high current densities.

With the foregoing and other objects in view, there is provided in accordance with the invention, an electrochemical storage cell or battery with at least one anode chamber containing molten alkali metal as the anolyte and at least one cathode chamber containing a sulfur-containing catholyte substance, with the anode chamber and the cathode chamber separated from each other by an alkali-ion-conducting solid electrolyte, and an addition of an additive to the catholyte substance, which additive converts sulfur chains in the catholytic substance into an electrically charged state for obtaining electromigration of the sulfur.

In accordance with the invention there is provided in an electrochemical storage cell or battery with at least one anode chamber containing molten alkali metal as the anolyte and at least one cathode chamber containing a sulfur-containing catholyte substance, with the anode chamber and the cathode chamber separated from each other by an alkali-ion-conducting solid electrolyte, the improvement which comprises addition of an additive to the catholyte substance, which additive converts sulfur chains in the catholyte substance into an electrically charged state for obtaining electromigration of the sulfur, wherein the additive is a reaction product of sulfur and a dienophilic compound.

There is provided in accordance with the invention reaction products of a dienophilic compound and sulfur having the general formula

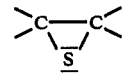

wherein the two carbon atoms belong to the dienophilic reactant and together with at least one S-atom from the sulfur reactant form a ring.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
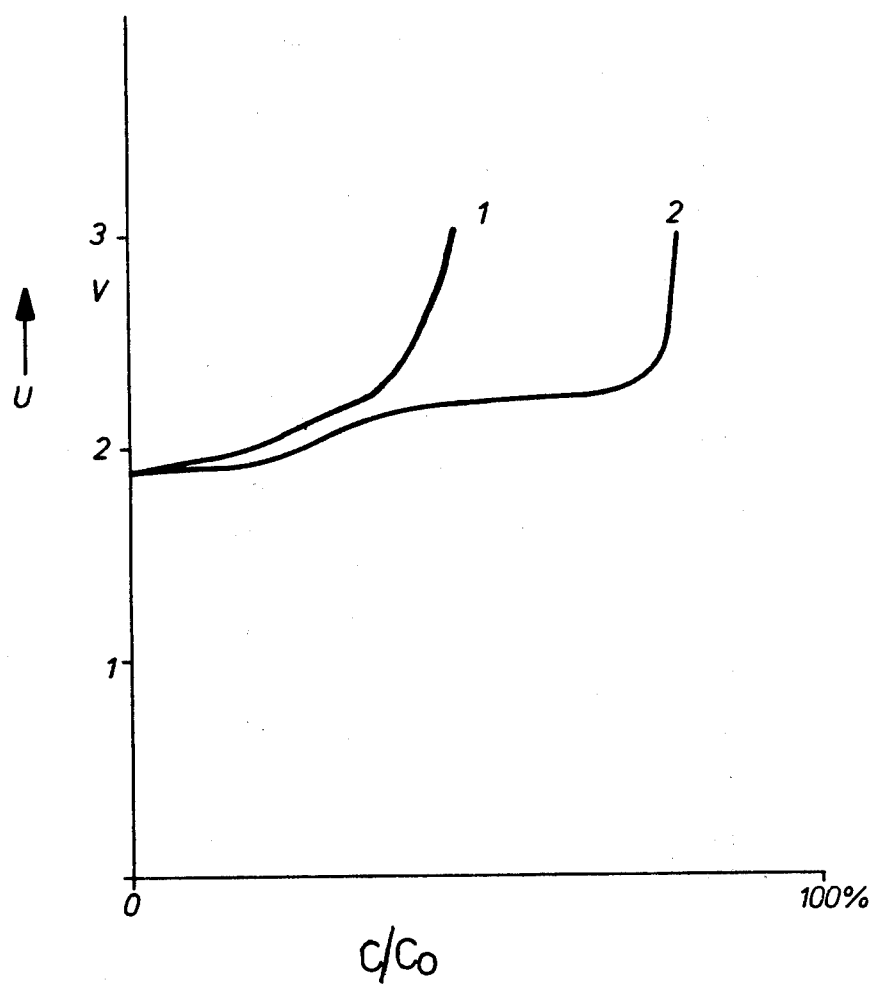
FIG. 1 has two curves (curve 1 without additive and curve 2 with additive) to show the effect of the additive on electromigration and improved mobility of the sulfur phase by increase in the relative capacity of the cell, FIG. 2 has three curves (curve 1 the first charging cycle, curve 2 the fifth cycle and curve 3 the tenth cycle) to show the long-term behavior of the cell with respect to capacity during repeated rechargings.

In a cell or battery of the type mentioned at the outset, the addition of an additive to the catholyte substance transfers the sulfur chains into an electrically charged state inducing an electromigration of the sulfur phase.

An additive is preferred which charges the sulfur chains partly positively and converts them partly into a negatively charged complex. Dienophilic substances have been found to be specially well suited as an additive, particularly compounds of the general formula

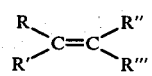

where R, R', R" and R'" are each a member selected from the group consisting of F, Cl, Br, CN and SCN. R, R', R" and R'" may be the same or different from each other.

In particular, tetracyanoethylene has been found excellent and is the preferred dienophilic compound additive.

Best results are usually obtained by adding the substances mentioned in amounts of 0.1 to 2 mol % based on the sulfur content in the cathode chamber. Amounts less than 0.1 mol % have in general been found not to be sufficiently effective. If, on the other hand, larger amounts are added, the negative influence due to intermolecular interactions is superimposed.

Independently of or in addition to additives which have a favorable effect on the electromigration of the sulfur phase, the addition of viscosity-lowering agents is advantageous. The elements boron, phosphorus and/or iodine yield particularly good results when added to the sulfur in the cathode chamber. Also, in this connection, the addition of selenium to the sulfur in the cathode chamber contributes favorably due to its effect of breaking down the sulfur chains.

Optionally, cells of the Na/S type contain in the cathode chamber, in addition to the sulfur, a capillary-active medium, particularly a felt of graphite or carbon, which fills the entire space between the solid electrolyte and the cathode collector contact. This medium has the purpose of increasing the boundary surface necessary for the electrochemical reaction, between sulfur or the alkali polysulfide produced during the discharge and the cathodic current collector. The felt can be considered an extension of the cathodic current collector. In addition, the distance between the electrolyte and the cathodic current collector, extended in this manner, becomes small so that the resistance of the sulfur or the sodium polysulfide contributes less to the internal resistance of the cell.

The effect of the additives can be visualized by the example of tetracyanoethylene as follows:

The S—S bonds in chains and rings should not be considered either as single bonds or as double bonds. Analagously to the C—C bonds in aromatics, the following border structure can be formulated

Dienophilic substances which form with dienes a Diels Alder addition, can in the presence of dienophilic substances with very strong dienophilic properties such as tetracyanoethylenes, give a Diels Alder reaction also with aromatics. The latter reaction is reversible at higher temperatures. An analogous reaction has been found between sulfur and tetracyanoethylene.

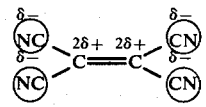

Through the inductive effect of the 4 cyano groups, partial positive charges are generated in the two carbon atoms.

Analogously, the charge transfer complexes observed between aromatics and tetracyanoethylene (R. L. Fluory, J. Phys. Chem., vol. 69, pages 1927 to 1933 (1965) can be assumed also between tetracyanoethylene and sulfur as follows:

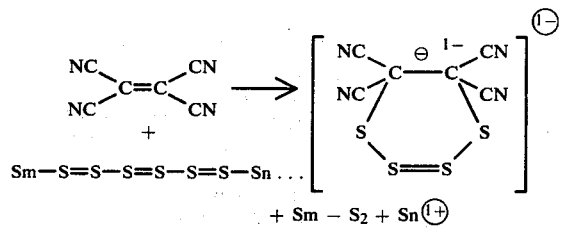

In this manner it is possible to accommodate part of the sulfur in the negatively charged charge transfer complex and to convert another part into a positively charged chain.

Thus the relocation of the sulfur is appreciably promoted by means of electromigration in both directions. The electromigration contributes to the improved result in the cell by avoiding the dangerous local accumulation of insulating sulfur layers.

In selecting suitable additives, the electron affinity of the additive should exceed the ionization energy of the sulfur. Positive sulfur chains are then produced. The additive should have reversibility and stability under the conditions of operation of the cell. Organic compounds as well as inorganic compounds may be employed as additives.

Figure 2:
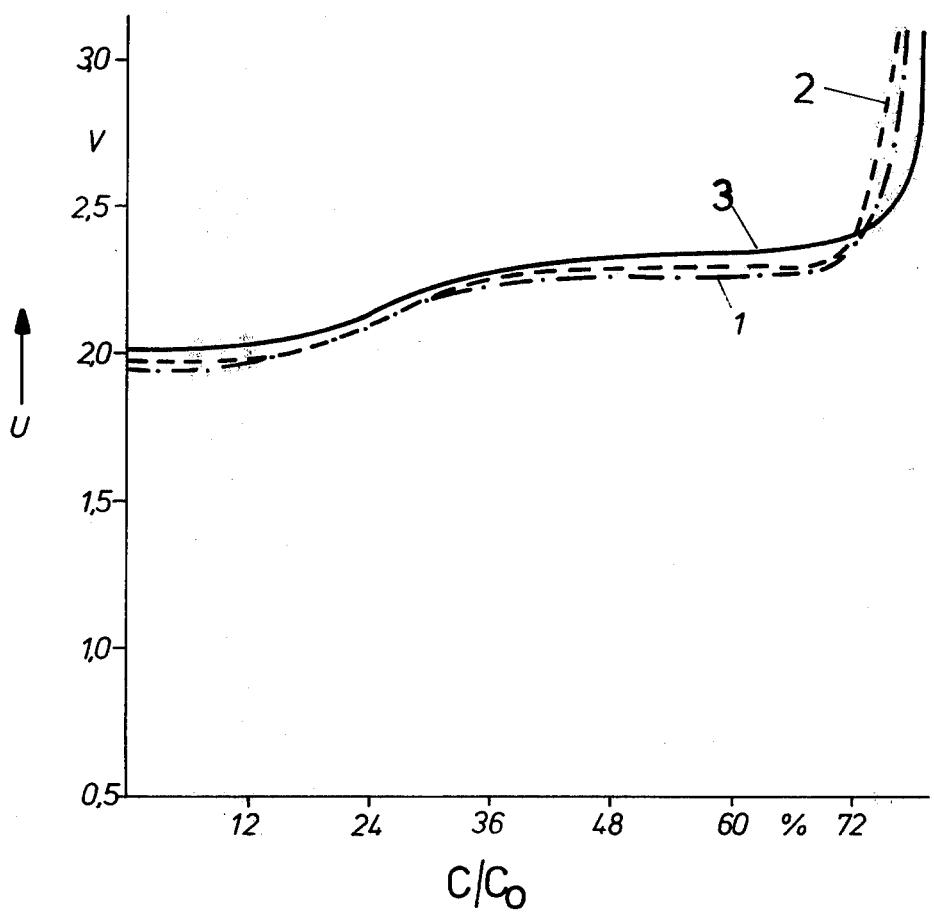

Referring to FIGS. 1 and 2 of the drawings, the figures show the effect of the electromigration obtained and the improved mobility of the sulfur phase. On the abscissa is plotted the relative capacity of the cell, $C/C_o$. This is understood to be the ratio of the measured capacity C to the theoretical capacity $C_o$. The theoretical capacity is that capacity which is obtained if the overall stoichiometry in the cathode space changes during the discharge from pure sulfur to $Na_2S_3$. The tests for the data of the curves were performed in Na/S cells with beta-$Al_2O_3$ tubes 5 cm long, closed at the bottom, with an outside diameter of 11 mm and an inside diameter of 9 mm.

The tubes at the top were fused to glass. They were in a glass-enclosed graphite cup which served as the cathodic current collector. The 4 mm wide gap between the current collector and the electrolyte tube was filled with graphite felt (fiber diameter 20 μm, porosity about 95%). Sodium was filled into the inside of the electrolyte tube and sulfur into the outer space. The tests were carried out at 300° C. Above the melt there was pure nitrogen.

In FIG. 1, Curve 1 corresponds to the above-described standard cell without additive. The cell has a theoretical capacity of 10 ampere-hours (corresponding to 18 g sulfur). In the case of Curve 2, 0.8 mol % tetracyanoethylene, based on the amount of sulfur present in the cathode chamber, was added.

The increase of the conductivity manifests itself in a large decrease of the overvoltage in the 2-phase region $S/Na_2S_5$ (from 40% of the charging capacity on), where Curve 2 is substantially still horizontal. In addition to a reduction of the internal resistance, the capacity can be increased from 40 to 70%.

In FIG. 2, the long-term behavior for the above-described standard cell and an addition of 0.8 mol % tetracyanoethylene is shown. On the abscissa is again plotted the above-defined relative capacity of the cell.

Curve 1 shows the first charging cycle, Curve 2 the fifth and Curve 3 the tenth cycle. The values are within the error limit, i.e. the desired improvement effect regarding the rechargeability persists to the full extent. The test was continued to the fiftieth cycle without change, i.e. without loss in improvement of the capacity.

The following Table 1 further indicates the influence of the amount of additive on the improvement of the relative capacity of the cell with tetracyanoethylene as the additive.

Table 1

| Addition of Tetracyanoethelene in Mol % | 0 | 0.1 | 0.2 | 0.4 | 0.8 | 1.2 | 1.6 | 2.4 |
|---|---|---|---|---|---|---|---|---|
| $C/C_o$ | 42 | 58 | 70 | 75 | 77 | 76 | 78 | 77 |

The Table shows that in the present case, the desired effect is fully developed from 0.2 mol % on. Under other conditions, however, higher concentrations may also be of advantage, particularly with respect to the long-term behavior.

If certain substances are used, a reduction of the viscosity takes place due to a breakdown of the sulfur chains in addition to the electromigration. Where this is not the case, it is advisable to add viscosity-lowering substances such as boron, phosphorus or possibly also iodine. Attention must be paid, of course, to the compatibility of the different additives among each other and with the main reactants.

Additives which are the reaction products of a dienophilic compound and sulfur were also found to be effective in promoting recharging of storage cells with high current densities. The dienophilic compound and sulfur are reacted outside the storage cell to form reaction products which are the additives to be added to the storage cell in a manner and amount similar to the dienophilic compound additive. The new additives have the general formula

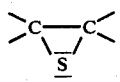

wherein the two carbon atoms belong to the dienophilic reactant and together with at least one S-atom and preferably less than ten sulfur atoms, desirably 3 to 5 S-atoms, from the sulfur reactant form a ring. Particular additives have the formula

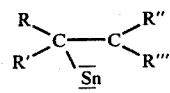

wherein, R, R', R" and R'" are the same or different members selected from the group consisting of F, Cl, Br, CN and SCN, and n is a numeral from 3 to 5 inclusive, preferably 3 to 4 inclusive.

The tetracyanoethylenes with a sulfur chain of 4 and 5 atoms ($C_6N_4S_4$ and $C_6N_4S_5$) and having the structural formulae are

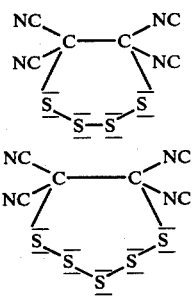

The following examples illustrate the production of additives by reaction of a dienophilic compound with sulfur outside the storage cell.

(a) Production of additive by addition of tetracyanoethylene ($C_6N_4$) and sulfur in the gas-phase.

2.8 g $C_6N_4$ and 2.8 g sulfur are filled into a 1 liter reaction vessel. The vessel is purged with nitrogen, thereafter evacuated and closed by melting. The reaction vessel which has been closed by melting is then placed for 24 hours in absence of light in a furnace heated to 450° C. After this time, the reaction vessel kept in the dark is slowly cooled to room temperature.

The obtained product (tetracyanoethylenesulfur) was a brown, earth-like substance, which liquefied at 130° C. The yield was 80%. By analysis with respect to the elements it was found out that the composition was $C_6N_4S_{3.8}$. From this it can be deduced that a mixture of $C_6N_4S_3$ and $C_6N_4S_4$ is formed. In the infrared spectrum a new peak appeared at 670 cm$^{-1}$ compared to the spectrum of pure tetracyanoethylene. Such a peak is typical for carbon-sulfur single bonds and the structure of the tetracyanosulfur rings has such typical carbon/-sulfur single bonds.

(b) Production of additive in a solvent.

1.5 g sulfur and 120 ml o-toluolnitrile were heated to 60° C. in a three-necked flask while stirring. After 50 minutes, all sulfur was dissolved with a yellow-green color. The electric conductivity measured 1.3 . 10$^{-5}$ Siemens. Then a green-brown colored solution of 1.5 g $C_6N_4$ in 80 ml o-toluolnitrile was added, which resulted in an instant sharp rise of the conductivity of the solution to 1.2 . 10$^{-4}$ Siemens. The value for conductivity also rose with increasing time of the experiment until after two days it remained constant at 3.2 . 10$^{-3}$ Siemens. The reaction-solution was dark brown then.

The solvent was removed by distillation at 95° C. in a rotation-evaporator. The solvent which was without color at the beginning of the experiment was now colored wine-yellow.

The residue was a black-brown substance which had the odor of o-toluolnitrile. The substance was dried on a clay dish. The melting point was 133° C. Analysis of the substance with respect to the elements showed a composition of $C_6N_4S_{4.3}$. In the infrared spectrum the peak appeared at 670 cm$^{-1}$, which peak is typical for carbon/sulfur-single bonds.

In the preparation of other additives with other dienophilic starting compounds the procedure is similar.

A mixture of tetracyanolsulfur compounds, as for example the reaction products, may be used as the additive. If desired, tetracyanolsulfur compounds may be isolated from the reaction mixture. $C_6N_4S_4$ separated from the reaction mixture is in the form of a solid substance, which has a melting point between 130° to 135° C. and shows a peak in the infrared spectrum at approximately 670 cm$^{-1}$, which peak corresponds to the carbon/sulfur-single bond.

The advantages of addition of a tetracyanoethylenesulfur compound instead of a tetracyanoethylene compound are:

1. higher capacity at the start and
2. better stability of the capacity of the storage cell.

If tetracyanoethylene in powder form is added to the sulfur powder in alkali/sulfur-storage cells some of the tetracyanoethylene may, due to catalytic action of oxygen traces, become polymerized, and thereby consumed as a by-product and not available anymore for the desired reaction with the sulfur. Thus, fewer tetracyanosulfur compounds are generated than are possible, and the tetracyanosulfur compounds in the sulfur are diminished. Thereby the theoretical possible cell capacity is not reached and also the theoretically possible reduction of the internal resistance is not reached. These disadvantages do not occur if the above mentioned tetracyanosulfur compounds are added to the sulfur.

Tests were conducted to show the effect of additives on the relative capacity of the cell.

The tests were performed in NA/S cells with 5 cm long beta-$Al_2O_3$-tubes, closed on the bottom with an outside diameter of 11 mm and an inside diameter of 9 mm.

The tubes at the top are fused to glass. They were disposed in a glass container with a cup-shaped cathodic graphite current collector. The 4 mm wide gap between the current collector and the electrolyte tube was filled with graphite-felt (fiber diameter 20 μm, porosity approximately 95%).

The interior of the electrolyte tube was filled with sodium. Sulfur was introduced into the outer space. The tests were carried out at 300° C. Above the melts was pure nitrogen.

Referring to the sulfur in the outer space, 0.2 mol % of the tetracyanosulfur compound were added. In a second experiment 0.4 mol %, in a third experiment 0.8 mol %, and in a fourth experiment 1.6 mol % of the tetracyanosulfur compound were added. Compared to experiments where only the corresponding mol percents tetracyanoethylene was added, an improvement of the capacity was achieved. The results are given in the following Table 2.:

Table 2

| Additive in Mol % | Relative Capacity of the Cell C/Co (%) |
|---|---|
| 0.2 $C_6 N_4$ | 70 |
| 0.2 $C_6 N_4 S_4$ | 74 |
| 0.4 $C_6 N_4$ | 75 |
| 0.4 $C_6 N_4 S_4$ | 80 |
| 0.8 $C_6 N_4$ | 77 |

Table 2-continued

| Additive in Mol % | Relative Capacity of the Cell C/Co (%) |
|---|---|
| 0.8 $C_6 N_4 S_4$ | 82 |
| 1.6 $C_6 N_4$ | 78 |
| 1.6 $C_6 N_4 S_4$ | 81 |
| no additive | 42 |

Figure 3:
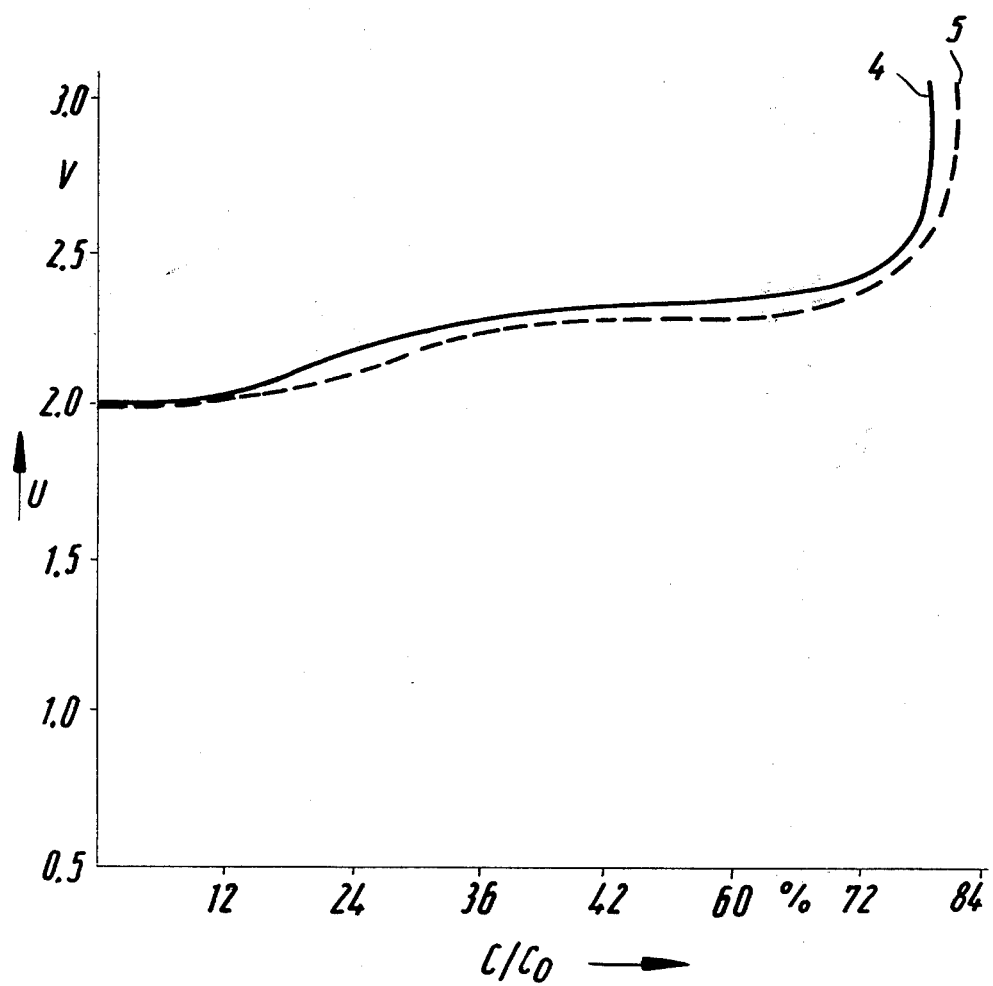
FIG. 3 has two curves to show the effect of the additive $C_6N_4$ (curve 4) and the additive $C_6N_4S_4$ (curve 5) on the capacity of the cell.

In FIG. 3, curve 4 shows the charge-behaviour in terms of relative capacity (C/Co) of a cell with 0.4 mol % $C_6N_4$ as an additive. Curve 5 is the corresponding curve with 0.4 mol % $C_6N_4S_4$ as an additive.

There is claimed:

1. In an electrochemical storage cell or battery with at least one anode chamber containing molten alkali metal as the anolyte and at least one cathode chamber containing a sulfur-containing catholyte substance, with the anode chamber and the cathode chamber separated from each other by an alkali-ion-conducting solid electrolyte, the improvement which comprises addition of an additive to the catholyte substance, which additive converts sulfur chains in the catholyte substance into an electrically charged state for obtaining electromigration of the sulfur, wherein the additive is an organic dienophilic compound.

2. Storage cell according to claim 1, wherein the dienophilic compound has the general formula

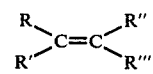

where R, R', R" and R'" are the same or different members selected from the group consisting of F, Cl, Br, CN and SCN.

3. Storage cell according to claim 2, wherein the dienophilic compound is tetracyanoethylene.

4. Storage cell according to claim 1, including the addition of a viscosity-lowering additive which lowers the viscosity of sulfur in the cathode chamber.

5. Storage cell according to claim 4, wherein the viscosity-lowering additive is selected from the group consisting of boron, phosphorus and iodine.

6. Storage cell according to claim 5, including the addition of selenium to the sulfur in the cathode chamber.

7. Storage cell according to claim 4, wherein the viscosity-lowering additive is selenium.

8. Storage cell according to claim 1, wherein the additive is in an amount of 0.1 to 2 mol % based on the sulfur content in the cathode chamber.

9. In an electrochemical storage cell or battery with at least one anode chamber containing molten alkali metal as the anolyte and at least one cathode chamber containing a sulfur-containing catholyte substance, with the anode chamber and the cathode chamber separated from each other by an alkali-ion-conducting solid electrolyte, the improvement which comprises addition of an additive to the catholyte substance, which additive converts sulfur chains in the catholyte substance into an electrically charged state for obtaining electromigration of the sulfur, wherein the additive is a reaction product of sulfur and a dienophilic compound.

10. Storage cell according to claim 9, wherein the dienophilic compound has the general formula

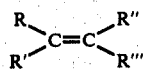

where R, R', R" and R'" are the same or different members selected from the group consisting of F, Cl, Br, CN and SCN and wherein the reaction product has 3-5 inclusive sulfur atoms.

11. Storage cell according to claim 10, wherein the reaction product has 3-4 inclusive sulfur atoms.

12. Storage cell according to claim 10, wherein the dienophilic compound is tetracyanoethylene.

13. Storage cell according to claim 9, including the addition of a viscosity-lowering additive which lowers the viscosity of sulfur in the cathode chamber.

14. Storage cell according to claim 13, wherein the viscosity-lowering additive is selected from the group consisting of boron, phosphorus and iodine.

15. Storage cell according to claim 14, including the addition of selenium to the sulfur in the cathode chamber.

16. Storage cell according to claim 15, wherein the viscosity-lowering additive is selenium.

17. Storage cell according to claim 9, wherein the additive is in an amount of 0.1 to 2 mol % based of the sulfur content in the cathode chamber.

18. Reaction products of a dienophilic compound and sulfur having the general formula

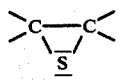

wherein the two carbon atoms belong to the dienophilic reactant and together with at least one S-atom from the sulfur reactant form a ring.

19. Reaction products according to claim 18 wherein the number of S-atoms is 3-5 inclusive.

20. Chemical compounds corresponding to the general formula

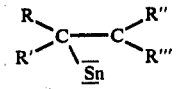

wherein R, R', R" and R'" are the same or different members selected from the group consisting of F, Cl, Br, CN and SCN, and n is a numeral from 3 to 5 inclusive.

21. Chemical compound according to claim 20 wherein n is a numeral from 3 to 4 inclusive.

22. Chemical compound corresponding to the general formula

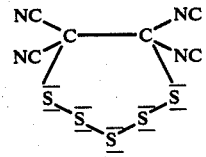

23. Chemical compound corresponding to the general formula

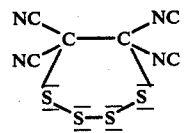

* * * * *